United States Patent Office 3,702,667
Patented Nov. 14, 1972

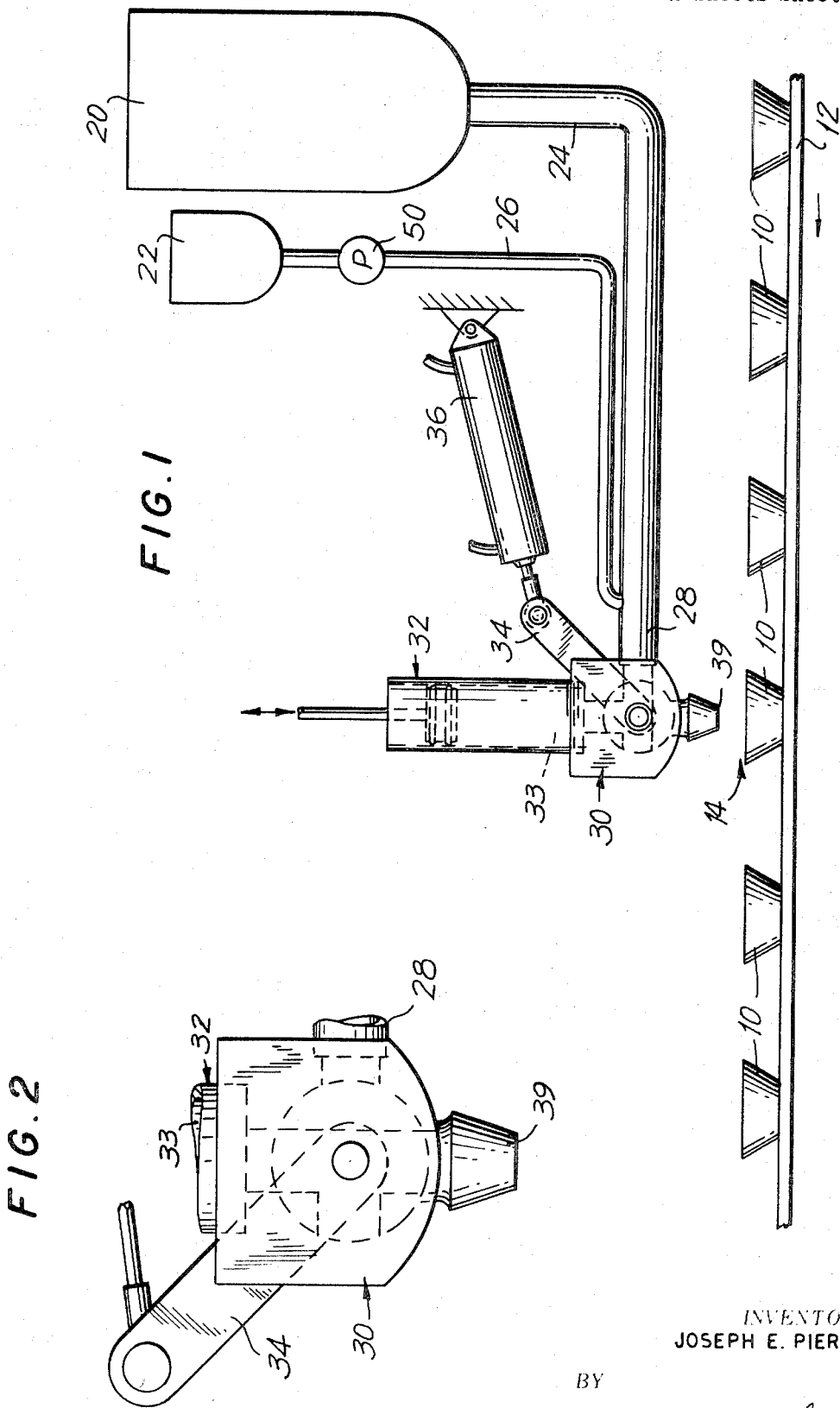

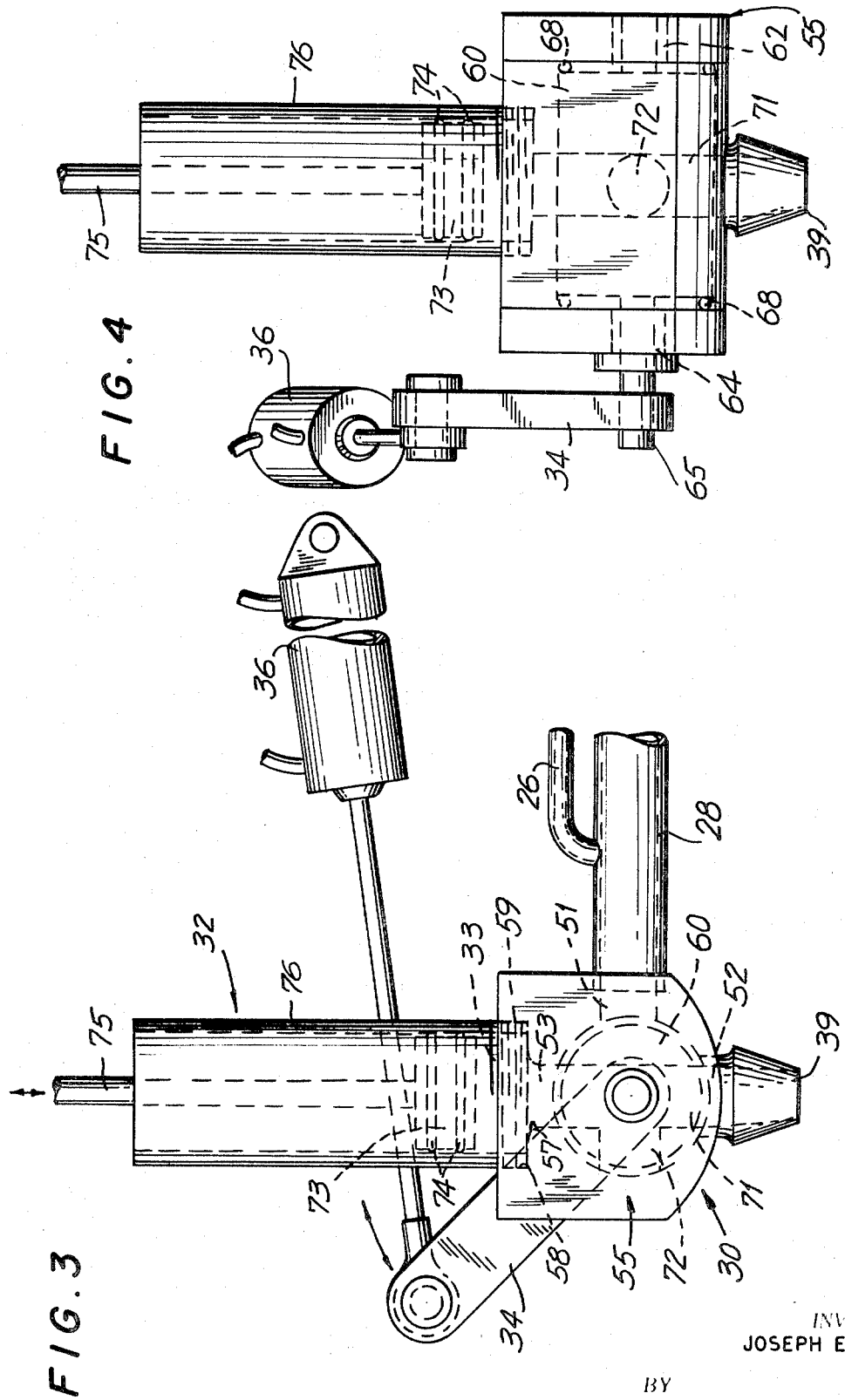

3,702,667
MIXING DISPENSER HAVING COMMON
FEED LINE
Joseph E. Pierce, Allentown, Pa., assignor to
AEI Corporation, Bethlehem, Pa.
Filed Jan. 12, 1971, Ser. No. 105,841
Int. Cl. B67d 5/60
U.S. Cl. 222—145                                  6 Claims

ABSTRACT OF THE DISCLOSURE

A machine for metering and mixing together two fluids and then dispensing the mixture. A feed line, with two input branches for receiving the two liquids to be mixed, is connected to an input terminal of a three terminal, two position valve. A suction pump is connected to a second terminal of the valve, and when said valve is in a first position draws into the pump the fluids from the feed line. The pump dispenses said drawn liquid through a third or output terminal of the valve when said valve is in its second position. Preferably, a positive displacement pump may be included in one of said branches of the feed line for applying a predetermined amount of one fluid to the feed line.

The invention relates generally to material handling machines, and particularly to machines which mix together two fluid components and dispense discrete amounts of the mixture.

There are many applications which require a machine for mixing together two fluids in a predetermined ratio, and subsequently dispensing the mixture in individual portions. Such machines typically would be used in the chemical and food industries. A typical application in the food industry is in dispensing gelatin type desserts or in dispensing dairy products. One specific example of the need for such a machine in the food industry is in the packaging of a relatively new kind of gelatin type dessert. These desserts are prepared in a ready to eat form, and retain their jelly properties at room temperature for several weeks. They are sold to the consumer in individual portion size plastic cups. The desserts contain the jellied material which is fruit flavored and which may be clear, or contain bite sized pieces of fruit.

The packaging of these desserts according to prior art techniques is to mix into a large vat or kettle the gelatin like substance typically carrageen, water, flavoring, coloring, pieces of fruit if desired, and a small amount of acid, such as citric acid, adipic acid or maleic acid. The addition of the acid is important, as the acid gives the tartness to the dessert and also releases or "picks-up" the fruit flavor. "Pick-up" means an increased awareness of the fruit flavor on consumption. A further function of the acid is to make the pH of the dessert slightly acidic, and thereby retard the possibility of bacterial growth, i.e. it serves as a preservative.

The various components of the dessert are mixed together in the vat and heated to a temperature of excess of 120°, typically, 160° to 170° F. This keeps the carrageen water mix in a liquid form and prevents it from forming a jelly. When the carrageen is subsequently cooled to room temperature, the liquid thickens and changes to a jelly. In the hot liquid mixture, however, the small amount of acid reacts unfavorably with the carrageen. Carrageen is basically a complex carbohydrate polysaccharide. Its complex structure gives it the gel properties at room temperature. The acid reacts with carrageen at 120° and breaks down the complex carbohydrate to convert (i.e. hydrolizes) it into simpler sugars and thereby destroy its gel properties. If sufficient time passes by, the carrageen will be completely broken down to the simplest sugar, sucrose. Therefore, when using the prior art technique, of mixing together the heated carrageen and acid in a single large vat, it is necessary to dispense the mixture as rapidly as possible before the acid can react with the carrageen and destroy its gel properties. Typically, the batch has to be disposed within a half an hour. If there is any delay in the operation of the machine, then that portion of the mixture which is not dispensed within a half an hour may have to be thrown away. Furthermore, as the batch is first mixed, and then dispensed over a period of time, the nature of the desserts being dispensed at the beginning and the end of the batch are different. Specifically, at the beginning there is the proper ratios of carrageen and acid, with the resulting good tartness and "pick-up" of the food flavor as well as proper gel quality. For desserts dispensed at the bottom of the batch after a portion of the acid has reacted with the carrageen, there is a lesser amount of tartness, a decrease amount of "pick-up" and a tendency for the gel not to hold. Attempts to correct this, by providing amounts of carrageen and acid so that the mixture dispensed at the middle of the batch has the proper balance of components, only results in desserts having excessive tartness and hardening of the gel for those items dispensed at the beginning of the batch, and bland taste and weak gel for those dispensed at the end of the batch. Furthermore, because of the necessity for disconnecting the empty vats for cleaning, and for connecting vats with freshly mixed batches, the filling machines cannot be operated continuously. Also, the present machines are expensive to operate because of the labor needed in constantly disconnecting and connecting the vats.

To avoid the shortcomings of prior art mixing and dispensing machines, this invention provides a novel machine in which the acid is added to the hot carrageen mix at or close to the point of packaging. Thus, the acid is added to a small amount of hot carrageen and the mixture is then immediately dispensed into a package. The acid is thus in the heated mixture for a very short period of time. The hot carrageen and the acid are kept in separate vats, and are replenished as needed. Thus the novel machine can be operated continuously. Furthermore, if for any reason it is necessary to interrupt the operation of the machine, e.g. if the packages to be filled become misaligned on an assembly line, it is possible to temporarily stop the automatic filling operation without fear of ruining the dessert waiting to be loaded.

In one embodiment of this invention, the acid is stored in one vat, and the mixture of carrageen, water, fruit flavor, and coloring is stored in a separate vat. The liquid in the second vat is heated and kept at an elevated temperature. If fruit is added to the second vat, an agitator is added to keep the fruit in suspension. A suction pump, is connected to the two vats, and through a valve which is synchronized with the operation of the suction pump, the two fluids are drawn into the chamber of the suction pump where they are mixed together. The input valve is then closed, and the pump expels the liquid from the chamber while an exit valve is opened which permits the discharge of the mixture into a suitably placed container. The opening and closing of the valves, and the drawing in and ejecting of the mixture by the suction pump may be synchronized with a conveyor belt carrying packages beneath the exit valve for receiving the dessert mixture from the machine.

In an additional embodiment of the machine of this invention, the acid is dispensed by a positive displacement pump synchronized with each cycle of the suction pump, thus a precisely controlled amount of acid is added to each package.

It will be appreciated that a further advantage of a machine constructed in accordance with this invention, is that it can be operated continuously. The composition of the hot carrageen stored in one vat, and the acid stored in a separate vat, does not change with time. Thus, the vats can be refilled when necessary, while the machine is continuously dispensing a mixture of the two. In the prior art machines it was necessary to mechanically connect and disconnect each new vat. Furthermore, vats for use with this machine can be made larger and contain enough fluid which will then be dispensed over a period of several hours.

The machine of the invention will also find application in packaging dairy products. In all of the food packaging it is essential that the machine be easily disassembled for cleaning, so as to prevent the build up of bacteria and the possible contamination of the food.

It is an object of this invention to provide a new machine for mixing together small amounts of fluids and dispensing the mixture.

It is a further object of this invention to provide a novel machine for mixing together fluids and dispensing the mixture and which can be run continuously and rapidly.

It is still a further object of this invention to provide a novel machine for efficiently and economically mixing together fluids and dispensing the mixture.

It is another object of this invention to provide a novel machine for metering and dispensing fluids which can be easily disassembled for cleaning.

The construction of illustrative embodiments as well as further objects and advantages thereof will become apparent when read in conjunction with the accompanying drawings wherein:

FIG. 1 is a schematic view of a machine of the invention in its operative environment.

FIG. 2 is a schematic view of the valve of FIG. 1 illustrating the valve in a particular position.

FIG. 3 is a detailed view of the valve and pump portion of the machine shown in FIG. 1.

FIG. 4 is a side view of the valve and pump shown in FIG. 3.

Referring now to FIG. 1 there is shown schematically an installation for filling packages or cups 10 as they move on a conveyor belt 12 past a filling station. The material to be mixed together and placed into the packages 10 is stored in two separate vats or kettles, 20 and 22. Continuing with the example discussed above, the vat 20 contains water with carrageen, artificial flavoring, and coloring, heated to a temperature typically in the range of 120° to 170°. Bite sized chunks of fruit may be added to the kettle 20 and the mixture is continuously agitated to keep the fruit suspended in the kettle. The vat 22 holds one of the well known acids that are added to increase tartness and the pick-up of flavor of desserts and typically is citric acid, adipic acid or maleic acid. Since the acid will deteriorate the gel properties of the carrageen at elevated temperatures, it is desirable that the two liquids be mixed together at this temperature, for the shortest possible time. The fluids from kettles 20 and 22 are fed through hoses 24 and 26 respectively, to a single feed line 28 which is connected to a two position valve 30. The valve is shown here in a first position which permits the passage of fluid from the feed line 28 to a piston pump 32. As the piston of the pump rises, fluid is drawn into the pump chamber 33. The volume of this chamber is equal to the amount of fluid that is to be dispensed into each container 10. After the piston pump has reached its uppermost position and its chamber is full, the valve 30 is moved to its second position. This is shown in FIG. 1 as the movement of a valve control arm 34 in the counter-clockwise direction under the operation of an air cylinder 36. The valve is shown schematically in its second position in the sketch of FIG. 2. With the valve in this position, the piston pump 32 discharges the contents of the chamber 33 by moving the piston downwards and expelling the mixture from the chamber through a nozzle 39 and into a container 10 which, at the moment of discharge, is at the filling station 14 on the conveyor belt 12.

In this machine, a small amount of the acid from kettle 22 is mixed with a small amount of the heated fluid from kettle 20 at the intersection of the lines 24 and 26 and the mixture is immediately dispensed into container 10 where it is cooled. Thus, the acid and the hot carrageen which react poorly together, are in contact for a very short period of time.

The two liquids from vats 20 and 22 may enter the feed line 28 either by gravity feed, or by means of pumps. It has been found particularly advantageous to insert a positive displacement pump 50 in the acid line. This pump produces a number of desirable results. One is the metering of the correct amount of acid during each cycle of the machine. Thus, neither too much nor too little acid is in each portion of dessert. Another is that the pump prevents possible flowing of the acid into the line 24 and going into the carrageen kettle 20. Furthermore, the pump 50 may accurately control the mixture of the acid to the heated carrageen material. For example, the acid may be injected only when the valve 30 is in the first position and the heated carrageen is flowing into the chamber of the suction pump. Alternatively, it may be advisable to insert the acid at that portion of the machine's cycle when the chamber is just beginning to be filled, or to insert the acid uniformly throughout the filling of the chamber.

Referring now to FIGS. 3 and 4, there is shown respectively a detailed front and side view of the valve 30 and the piston pump 32 of FIG. 1. The valve 30 is shown in a dispensing position, and the piston pump is shown in a down position, i.e. having just completed dispensing a measure of fluid and ready to draw in a new quantity of fluid after the valve moves to the filling position (which in the drawing here, would be with the crank arm 32 of the valve moved clockwise).

The valve itself 30, is shown as having three ports or terminals: an input terminal 51 connected to the feed line 28, an output terminal 52 connected to the nozzle 39 and a reservoir terminal 53 which is connected to the piston pump 32.

The valve is shown here as a housing 55 having a hollow cylindrical internal chamber. The three terminals 51, 52, and 53, extend through the walls of the housing at one side and the top, and bottom, to provide a communicating path between the outside of the valve and the internal cylindrical chamber. The three holes are located at the center of the housing in a plane perpendicular to the hollow cylindrical axis. The first, or input port 51, is fitted with a coupling and is connected to the feed line 28. The second, or output port 52, it also provided with a coupling which in turn is attached to the nozzle 39. The third, or reservoir port 53, located on the upper portion of the valve is shaped at its upper end with smoothly curved walls 57 which terminate in a wide opening 58 having vertical side walls 59. The side walls 59 attach to the lower portion of the piston pump and the curved walls 57 form the lower surface of the piston pump chamber 33. The curved walls 57 facilitate the flow of liquid into and out of the piston pump chamber 33, and minimize the mangling of the fruit chunks.

The hollow cylindrical portion of the housing is fitted with a solid cylindrical member 60. Cylinder 60 is pivotally mounted in the side walls of the housing as shown at 62 and 64 in FIG. 4. One end of the cylinder is fitted with a co-axial handle 65 which extends past the walls of the valve housing where it is attached to the valve crank arm 34. O-rings 68 are mounted between the end of the solid cylindrical member and the side walls of the valve housing to prevent possible leakage of fluid. A first bore 71 extends through the center of the solid cylindrical member along its diameter; and a second hole 72 extends radially from the center of the cylindrical member and joins the first hole. The center lines of these two holes 71 and 72 are co-planar with the center lines of the three ports 51, 52, and 53 in the housing. It will be appreciated that as the solid cylindrical member 60 is rotated in the housing, a connecting path is first established between the input port 51 and tubing 28, and the reservoir port 53 and chamber 33 of the pump. When the solid cylindrical member 60 is rotated by operation of the crank arme 34, 90° counter-clockwise to the position as shown in FIG. 3, a conducting path is set up between the reservoir port 53 and the output port 52 and nozzle 39.

The piston pump 32 is shown as having a cylindrical side wall 76 threaded at the lower end and joined to the side walls 59 on the reservoir port 57. The pump includes a plunger or piston 73 fitted between the side wall 76 and having a pair of O-rings 74 surrounding its external diameter to minimize spilling. The lower surface of the pump chamber 33 is the upper portion of the valve housing that connects to and surrounds the reservoir port of the housing. A suitable driving means, not shown, is connected to the piston 73 be means of a shaft 75. The driving means is synchronized with the valve to raise the piston when the valve has the crank arm in the right most position, i.e. passage of fluid from the feed line to the pump chamber. The piston is driven in the down position when the crank arm for the valve is in the left most position, as shown in FIG. 3.

In summary, there has been shown a machine for mixing together small amounts of two fluids and then dispensing the mixture. Although the machine has been described as mixing together a particular dessert product, the invention should not be limited to only mixing this product, as the machine has general application to mixing together and dispensing any kind of fluids. Furthermore, the invention should not be limited to machinery only applicable to foods, as it may be used to mix non-eatable items such as chemicals.

The above description of the invention is intended to be illustrative only, and various changes and modifications in the embodiments described may occur to those skilled in the art. These changes may be made without departing from the scope of the invention, and thus it should be apparent that the invention is not limited to the specific embodiments described or illustrated in the drawings.

What is claimed is:

1. Apparatus for metering and mixing two fluids and thereafter dispensing the mixture, said apparatus comprising, first and second reservoirs respectively containing said fluids, a common fluid feed line having two input branches respectively connected to said reservoirs, and a valve assembly and dispensing unit operatively connected to said common fluid feed line downstream of the juncture of said branch lines, said valve assembly including a valve casing having an inlet port communicating with said common feed line, a fluid dispensing port and a fluid reservoir port, a valve body having a plurality of communicating bores therein, means for moving said valve body between first and second positions wherein in the first position said valve body provides communication between said inlet port and said reservoir port and closes said dispensing port, and in the second position of said valve body the body provides communication between said reservoir port and said dispensing port and closes said inlet port, and suction pump means connected to said valve casing in communication with said reservoir port for drawing fluids from said feed line through said valve and into said pump when said valve is in said first position and for dispensing said fluids through said dispensing port when said valve is in said second position, whereby said two fluids are jointly drawn from said reservoirs, mixed together in said common feed line and suction pump, and jointly dispensed therefrom.

2. The apparatus according to claim 1 which includes a positive displacement pump in at least one of said branches of the feed line synchronized with said suction pump and said valve assembly for supplying a predetermined amount of one fluid to said feed line in accordance with the position of said valve body and the suction pump.

3. The apparatus according to claim 2 wherein said displacement pump supplies said predetermined amount of liquid to said feed line when said valve is in the first position and said suction pump is drawing liquid from the feed line.

4. A machine according to claim 1 wherein said fluids are applied to said feed line by a gravity feed.

5. The apparatus according to claim 1 wherein said valve body is generally cylindrical and the bores therein define a T providing said communication between said respective ports.

6. The apparatus according to claim 5 wherein one of said fluids contains solid particles and said valve casing has outwardly opening curved surfaces defining a portion of said reservoir port adjacent the point of connection thereof with said suction pump whereby said solid particles are guided into and out of said suction pump by said surface with minimal damage.

References Cited
UNITED STATES PATENTS

| | | | |
|---|---|---|---|
| 1,327,990 | 1/1920 | French | 222—380 X |
| 3,550,814 | 12/1970 | Lersner | 222—145 |
| 3,409,174 | 11/1968 | Radcliffe | 222—145 X |

STANLEY H. TOLLBERG, Primary Examiner